Nov. 1, 1932.  W. B. THIEMANN  1,885,964
STEERING DEVICE FOR TRACTORS
Filed April 23, 1929
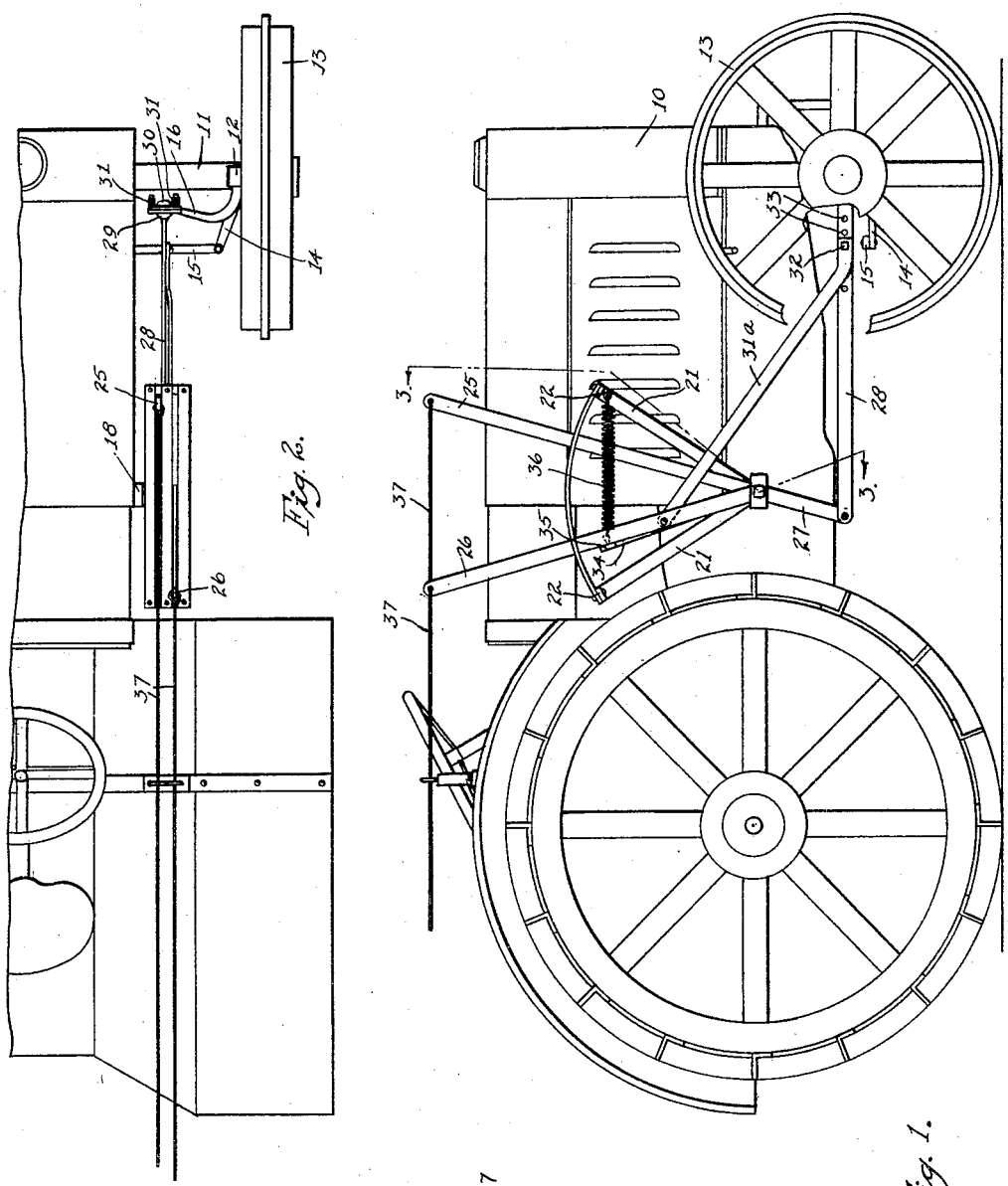
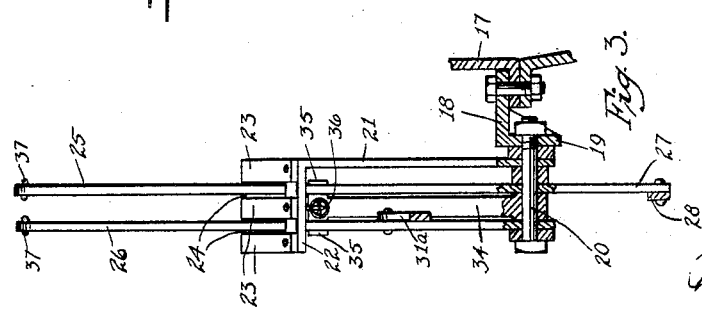
Inventor
William B. Thiemann
by Orwig & Hague Attys.

Patented Nov. 1, 1932

1,885,964

UNITED STATES PATENT OFFICE

WILLIAM B. THIEMANN, OF ALBERT CITY, IOWA

STEERING DEVICE FOR TRACTORS

Application filed April 23, 1929. Serial No. 357,507.

This invention relates to improvements in steering devices for tractors of that type designed to be attached to the tractor in place of the original steering mechanism, and when so attached provides means whereby the tractor may be steered from a remote position, preferably back of the tractor, by means of a pair of flexible members such as cables, whereby the operator may position himself on an implement drawn back of the tractor, and at the same time easily and accurately control the steering of the tractor.

The object of my invention is to provide a steering device of simple, durable and inexpensive construction, which may be easily and quickly applied to the small tractors in common use, and when so applied provides means whereby the tractor may be easily steered by a pair of flexible cables or lines.

A further object is to provide in a steering device for tractors of the type above described improved means whereby the tractor will be caused to automatically follow a straight line when the flexible steering members are not operated, and to include means whereby the steering mechanism of the tractor will be automatically moved to such position that the tractor will be advanced in a straight line regardless of the direction in which the tractor may be turning when the flexible steering devices are released.

My invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a tractor showing the manner in which my improved device is applied thereto.

Figure 2 is a plan view of the same.

Figure 3 is a detail sectional view taken on the line 3—3 of Figure 1.

The numeral 10 indicates a tractor of the ordinary type now in commercial use, and provided with a fixed front axle 11 having at each end a pivoted spindle 12 on which is mounted the front wheels 13. Each of the spindles 12 is provided with a spindle arm 14, which arms are connected by a link 15 in the usual manner. One of the spindles is also provided with a steering arm 16 from which the usual steering link is removed.

Secured to one side of the tractor frame 17 is a bracket 18 having a downwardly extending flange 19 designed to support a horizontally arranged pivot bolt 20.

Fixed to the flange 19 are upwardly extending and diverging frame members 21, their upper ends having outwardly extending portions 22. The portions 22 are designed to support three segmental members 23 spaced apart a slight distance to provide slots 24. Supported in one of the slots 24 is a lever 25, and in the other slot a lever 26. Said levers are pivotally mounted on the bolt 20. The lever 25 has a downwardly extending arm 27.

The lower end of the arm 27 is pivotally connected to one end of a steering link 28 which has its forward end provided with a socket member 29. A coacting socket member 30 is provided, which is yieldably retained in position by means of suitable bolts having springs 31. The socket devices 29 and 30 are designed to receive the ball of the steering arm 16.

The lever 26 has one end of an auxiliary steering link 31a pivoted to said lever at a point above the pivot bolt 20 a distance equal to the length of the member 27. The opposite end of the auxiliary link 31a projects downwardly and is pivotally connected to the link 28 by means of a bolt 32, which is mounted in one of a series of openings 33 in said link, so that the member 31a is adjustably connected with the link 28.

Pivotally supported to the bolt 20 and between the levers 25 and 26 is an arm 34, having at its upper end laterally extending lugs 35 designed to be brought into engagement with the rear edges of the levers 25 and 26. A spring 36 has one end connected to the upper end of the arm 34 and its other end to the forward one of the members 22.

The upper end of each of the levers 25 and 26 is provided with a flexible line or cable 37, of such length that the rear ends may be secured to an implement being drawn by the tractor, so that a considerable amount of slack is in the cables when the levers 25 and 26 are in common lateral alinement, at which time the back edges of both of the levers will be engaged by the lugs 35 and the steering mechanism adjusted to advance the tractor forwardly in a straight line.

It will readily be seen by the construction of the device that if the upper end of the lever 25 is pulled rearwardly by means of the cable 37, then the member 27 will be moved forwardly, causing the link 28 to be moved forwardly and the front wheel 13, as shown in Figure 2, to be swung in a clockwise direction, and at the same time the link 31 will be moved forwardly, causing the lever 26 to be moved forwardly, or if the upper end of the lever 26 is moved rearwardly, then the link 31 will be moved rearwardly, which in turn will move the link 28 rearwardly and swing the wheel 13 in a counter-clockwise direction.

As the lever 26 is moved rearwardly, said lever will also move the upper end of the arm 34 rearwardly, applying increased tension to the spring 36 in the manner illustrated in Figure 1 of the drawing, at which time the lever 25 will be moved forwardly and free from the lugs 35.

Assuming that the lever 26 is held rearwardly and the tractor is advanced, then it will be seen that the tractor will be turned. After the tractor has been turned the desired amount, the cable 37 is released, after which the spring 36 will move the lever 26 forwardly, and at the same time the lever 25 rearwardly until the lever 25 engages the lug 35. The spring 36 will then maintain the tractor in a forward direction.

Thus it will be seen that I have provided a steering device for tractors of very simple and cheap construction, which may be easily and quickly applied, and when so applied will be very effective and sensitive in its operation. The device is remarkably easy to operate, and under ordinary conditions a tractor may be steered by tension applied by one finger of the operator.

I claim as my invention:

1. In combination, a tractor frame, having front axles provided at each end with wheel spindles and the usual connecting links and devices for causing said wheels to be steered in unison, and also including a steering arm, a bracket member for said tractor frame, a pair of upright lever devices pivotally connected to said bracket member, each being provided at its upper end with a flexible steering device, one of said levers having a downwardly extending arm, a steering link having one end pivotally connected to said arm and its opposite end pivotally connected to said steering device, an auxiliary steering link pivotally connected to the other upright lever at a point above its pivot center, said auxiliary steering link being pivotally connected to the first said steering link, an arm pivotally mounted between said levers and having laterally extending lugs designed to engage the rear edges of said levers, and a spring for imparting forward movement to said arm.

2. A steering device for tractors, comprising a supporting bracket, a pair of upright levers pivoted to said bracket, means for operatively connecting said levers to the steering mechanism of said tractor, whereby the rearward movement of one lever will cause the tractor to be steered in one direction, and rearward movement of the other lever will cause said tractor to be steered in the opposite direction, and a single yieldable means mounted to engage both of said levers when in position to steer the tractor straight ahead, and to engage either of the rearwardly moving levers as said levers are operated to steer the tractor laterally, for automatically returning said levers to their straight ahead steering position.

3. In combination, a tractor frame having supporting wheels, means for steering one set of supporting wheels, devices for operating and controlling said steering means, including a pair of flexible steering members, means actuated by one of said flexible steering members to steer said wheels in one direction, means actuated by pulling the other flexible steering member for operating the tractor wheels in another direction, said steering devices including a single yieldable means for engaging and returning the steering mechanism to a normal position, the normal tension of the yieldable means being sufficient to retain the steering mechanism in said normal position as the tractor is advanced.

4. In combination, a tractor frame having supporting wheels, means for steering one set of supporting wheels, devices for operating and controlling said steering means including a pair of flexible steering members, means actuated by one of said flexible steering members to steer said wheels in one direction, means actuated by pulling the other flexible steering member for operating the tractor wheels in another direction, a steering device including yieldable means for engaging and returning the steering mechanism to a normal position, the entire active tension of the yieldable means being applied to said steering means, said active tension being sufficient to maintain the steering mechanism in said normal position as the tractor is advanced.

WILLIAM B. THIEMANN.